US006381093B2

(12) United States Patent
Yoshida et al.

(10) Patent No.: US 6,381,093 B2
(45) Date of Patent: *Apr. 30, 2002

(54) THIN FILM MAGNETIC HEAD WITH MAGNETIC FILMS WITH INCREASING WIDTHS FROM A SURFACE FACING A RECORDING MEDIUM

(75) Inventors: Makoto Yoshida; Noboru Yamanaka, both of Saku; Koichi Terunuma, Hohya; Yasufumi Uno, Nagano, all of (JP)

(73) Assignee: TDK Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,987

(22) Filed: Sep. 29, 1998

(30) Foreign Application Priority Data

Oct. 1, 1997 (JP) .............................................. 9-268327
Aug. 11, 1998 (JP) ............................................ 10-227341

(51) Int. Cl.⁷ ............................ G11B 5/31; G11B 5/187; G11B 5/39
(52) U.S. Cl. ......................... 360/126; 360/122; 360/317
(58) Field of Search ................................. 360/317, 126, 360/121, 119, 122

(56) References Cited

U.S. PATENT DOCUMENTS

| 5,438,747 A | | 8/1995 | Krounbi et al. .............. 360/113 |
| 5,452,164 A | | 9/1995 | Cole et al. ................... 360/113 |
| 5,473,491 A | * | 12/1995 | Fujisawa et al. ............ 360/126 |
| 5,600,519 A | | 2/1997 | Heim et al. .................. 360/126 |
| 5,719,730 A | * | 2/1998 | Chang et al. |
| 5,726,841 A | * | 3/1998 | Tong et al. .................. 360/122 |
| 5,805,391 A | * | 9/1998 | Chang et al. ................ 360/126 |
| 5,831,801 A | * | 11/1998 | Shouji et al. ................ 360/126 |
| 5,850,325 A | * | 12/1998 | Miyauchi et al. ........... 360/126 |
| 6,104,576 A | * | 8/2000 | Santini et al. ............... 360/126 |
| 6,144,533 A | | 11/2000 | Fukuda et al. .............. 360/313 |

FOREIGN PATENT DOCUMENTS

| JP | 7-225917 | 8/1995 |
| JP | 7-262519 | 10/1995 |
| JP | 8-249614 | 9/1996 |

OTHER PUBLICATIONS

U.S. application No. 09/161,987, filed Sep. 29, 1998, pending.

U.S. application No. 09/818,842, filed Mar. 28, 2001, pending.

* cited by examiner

Primary Examiner—Craig A. Renner
(74) Attorney, Agent, or Firm—Oblon, Spivak, McClelland, Maier & Neustadt, P.C.

(57) ABSTRACT

The present invention relates to a thin film magnetic head which eliminates the problems of degradation in the recording magnetic field pitch and recording bleed occurring due to leaked magnetic field by preventing magnetic saturation from occurring at pole tips. A write element is provided with a first pole portion, a second pole portion and a gap film. The gap film is provided between the first pole portion and the second pole portion. The second pole portion includes a third magnetic film and a fourth magnetic film. The third magnetic film is adjacent to the gap film and the fourth magnetic film is adjacent to the third magnetic film. The third magnetic film has a width W20 at a position receding from its surface facing opposite the medium by a receding quantity ΔL, which is larger than the width W21 at the surface facing opposite the medium.

14 Claims, 10 Drawing Sheets

THIN FILM MAGNETIC HEAD WITH MAGNETIC FILMS WITH INCREASING WIDTHS FROM A SURFACE FACING A RECORDING MEDIUM

BACKGROUND OF THE INVENTION

1. Field of the Invention

The present invention relates to a thin film magnetic head.

2. Discussion of Background

Most thin film magnetic heads employed in magnetic disk devices constituting computer storage apparatuses at present are the combined type that are provided with a thin film write element and a magnetoresistive (MR) read element. MR read elements, which are not dependent upon the speed relative to the magnetic disk, are capable of achieving a high degree of resolution. An MR read element includes a first shield film, a second shield film and an MR element. The first shield film and the second shield film are provided over a distance from each other via an appropriate nonmagnetic insulator and the MR element is provided between the first shield film and the second shield film.

The write element, which is constituted of an inductive electromagnetic transducer, is laminated on the MR read element. An inductive thin film magnetic transducer to constitute the write element is provided with a first magnetic film which also functions as the second shield film for the MR read element, a second yoke, a gap film, a coil film supported by an insulating film and the like.

The front ends of the first magnetic film and the second yoke are respectively constituted of a first pole tip and a second pole tip that face opposite each other over the gap film having a very small thickness, and a write operation is performed at the first and second pole tips. The first magnetic film and a second magnetic film are linked with each other so that their yokes complete a magnetic circuit at a back gap portion located on the opposite side from the first and second pole tips. The coil film is formed winding around the linking area of the yokes in a coil.

In order to support high recording density using this type of thin film magnetic head, the quantity of data stored per unit area of the magnetic disk (areal density) must be increased. An improvement in the areal density is achieved by improving the performance of the magnetic recording medium such as a magnetic disk and increasing the frequency at the write circuit as well as by improving the capability of the write element.

In one of the means for increasing the areal density by improving the capability of the write element, the gap length between the pole tips is reduced. However, since a reduction of the gap length leads to a reduction in the recording magnetic field intensity between the pole tips, there is naturally a limit to the degree to which the gap length can be reduced.

In another means for increasing the areal density, the number of data tracks that can be recorded on the magnetic disk is increased. The number of tracks that can be recorded on a magnetic disk is normally expressed as TPI (tracks per inch). The TPI capability of a write element may be enhanced by reducing the size of the head that determines the width of the data tracks. The head size is normally referred to as the head track width.

In the case of a conventional thin film magnetic head in the prior art described above, since the first magnetic film at the write element is also employed as the second shield film of the MR read element, the width of the lower portion cannot be reduced, and consequently, a rather large side fringing magnetic field is generated during a recording operation. This magnetic field is caused by a leak of magnetic flux from the second pole tip whose width is reduced to the first magnetic film whose width is not reduced. Such a side fringing magnetic field restricts the lower limit of width that can be achieved and limits the degree to which the track density can be improved. In addition, it degrades the off-track performance when track data that have been written are read by the MR element.

As a means for eliminating the problem discussed above, Japanese Unexamined Patent Publication No. 262519/1995 and Japanese Unexamined Patent Publication No. 225917/1995 disclose a means for adjusting the width of the lower portion to the width of the second pole tip through ion beam milling.

In addition, U.S. Pat. No. 5,600,519 discloses a structure provided with a tapered portion between the zero throat point and an expanded portion at the first magnetic film and the second magnetic film.

Furthermore, U.S. Pat. No. 5,452,164 discloses a structure achieved by setting the width of the second yoke larger than the width of the second pole tip so that the two side surfaces of the second yoke in the widthwise direction project out from the two side surfaces of the second pole tip.

However, when the track width at the head is reduced, magnetic saturation tends to occur at the pole tips, which results in degradation of the recording magnetic field pitch and causes the magnetic field to readily leak through the two sides of the pole tip in the direction of its width to induce recording bleed due to the leaked magnetic field. None of the publications on the prior art technologies disclose a means for solving this problem.

SUMMARY OF THE INVENTION

It is an object of the present invention to provide a separate type thin film magnetic head in which the yokes and the pole tips are separated.

It is a further object of the present invention to provide a separate type thin film magnetic head with which magnetic saturation at the pole tips can be prevented to eliminate problems of degradation in the recording magnetic field pitch and recording bleed occurring due to leaked magnetic field.

In order to achieve the objects described above, the thin film magnetic head according to the present invention is provided with at least one write element. In the write element, which includes a first pole portion, a second pole portion and a gap film, the gap film is provided between the first pole portion and the second pole portion. The second pole portion includes a third magnetic film and a fourth magnetic film, with the third magnetic film provided adjacent to the gap film and the fourth magnetic film provided adjacent to the third magnetic film. The third magnetic film has a width W20 at a position receding from its surface facing opposite the medium, which is larger than its width W21 at the surface facing opposite the medium.

As described above, in the thin film magnetic head according to the present invention, the third magnetic film of the second pole portion is adjacent to the gap film. Consequently, by using the third magnetic film as a pole tip and setting the head size that determines the width of the data tracks to very small dimensions determined by the width of the third magnetic film to improve the TPI capability, high density recording is achieved.

At the same time, the fourth magnetic film included in the second pole portion is provided adjacent to the third magnetic film. By using the fourth magnetic film as a yoke, the magnetic flux which is required for a write operation can be supplied to the third magnetic film constituting the pole tip from the fourth magnetic film. In other words, according to the present invention, a separate type thin film magnetic head in which the pole tip is separated from the yoke can be achieved.

According to the present invention, the third magnetic film has the width W20 at a position receding from its surface facing opposite the medium, which is larger than the width W21 at the surface facing opposite the medium. This structure prevents magnetic saturation from occurring at the pole tip constituted of the third magnetic film to eliminate the problems of degradation of the recording magnetic field pitch and recording bleed occurring due to a leaked magnetic field.

In one specific mode of the thin film magnetic head according to the present invention, the first pole portion includes a first magnetic film and a second magnetic film. The second magnetic film is provided adjacent to the gap film, whereas the first magnetic film is provided adjacent to the second magnetic film. By combining this structure for the first pole portion and the structure of the second pole portion described earlier, a structure which is achieved by providing the first magnetic film, the second magnetic film, the gap film, the third magnetic film and the fourth magnetic film adjacent to each other in this order is realized. By adopting this structure, in which the second magnetic film and the third magnetic film among the four magnetic films, i.e., the first magnetic film to the fourth magnetic film, are employed as pole tips, the head size which determines the width of the data tracks can be set very small, determined by the widths of the second magnetic film and the third magnetic film to increase the TPI capability so that high density recording can be achieved.

In addition, the first magnetic film and the fourth magnetic film may be extended toward the rear from the pole portions to constitute yokes with the portions extended toward the rear. In this structure, the magnetic flux required for a write operation is supplied from the first magnetic film and the fourth magnetic film constituting the yokes to the second magnetic film and the third magnetic film constituting the pole tips.

The present invention further discloses pole dimensions that are effective for maintaining the write magnetic field and preventing recording bleed from occurring due to a leaked magnetic field.

The thin film magnetic head according to the present invention normally includes an MR read element. In the MR read element, which includes a first shield film, a second shield film and an MR element, the first shield film and the second shield film are provided over a distance from each other with the MR element located between the first shield film and the second shield film.

The write element is laminated on the MR read element. In this structure, the second shield film also functions as the first magnetic film of the write element to achieve a reduction in thickness.

BRIEF DESCRIPTION OF THE DRAWINGS

Other objects, structural features and advantages of the present invention are explained in further detail by referring to the attached drawings illustrating preferred embodiments of the present invention, in which.

DETAILED DESCRIPTION OF THE PREFERRED EMBODIMENTS

In FIGS. 1 to 4, throughout this embodiment, a combined type thin film magnetic head provided with both a write element 2 and an MR read element 3 is disclosed. The write element 2 and the MR read element 3 are formed on a base body 1 which is employed as a slider, with the read/write area being located at an air bearing surface (hereafter referred to as an ABS) 10 of the base body 1. The arrow "a" indicates the direction in which the magnetic recording medium rotates (the direction of airflow). The write element 2, which is constituted of an inductive thin film magnetic transducer, is laminated on the MR read element 3. The write element 2 is provided with a pole portion 20.

Figure 3:
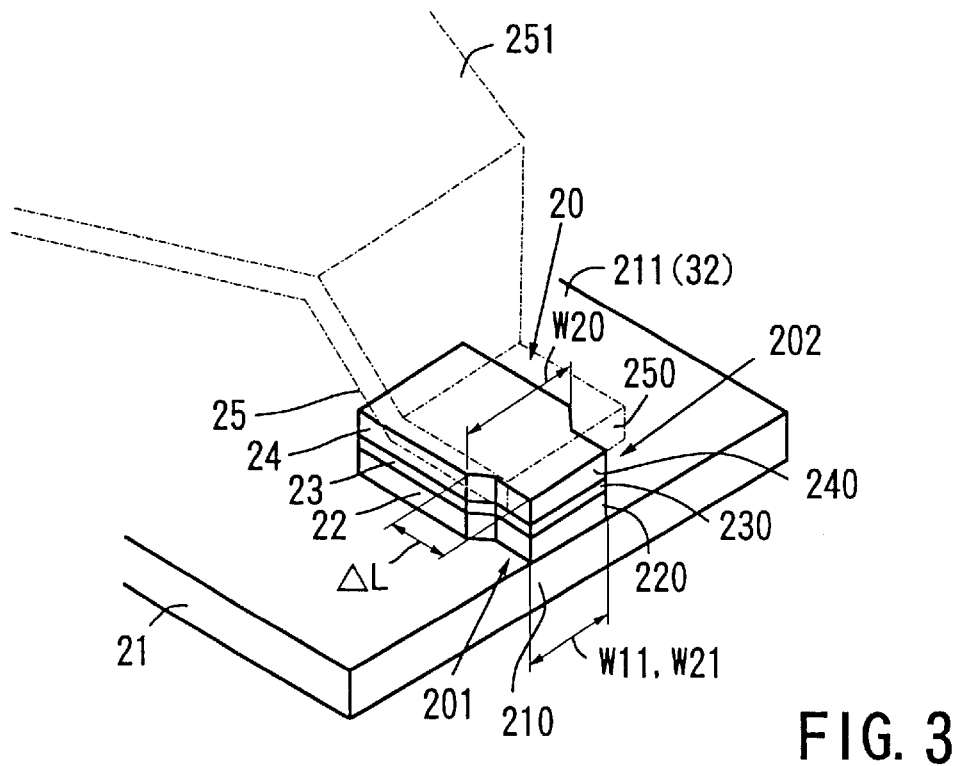
FIG. 3 is an enlarged perspective of the pole portion of the thin film magnetic head illustrated in FIG. 1, shown minus the fourth magnetic film.

As FIG. 3 clearly illustrates, the pole portion 20 includes a second pole portion 202, a first pole portion 201 and a gap film 23. The gap film 23 is provided between the second pole portion 202 and the first pole portion 201.

The second pole portion 202 includes a third magnetic film 24 and a fourth magnetic film 25. The third magnetic film 24 is laminated on and adjacent to one surface of the gap film 23. As a result, the third magnetic film 24 may be employed as a pole tip to set the head size, which determines the width of the data tracks, very small, determined by the width W21 of the third magnetic film 24 so that the TPI capability can be improved to achieve high density recording.

At the same time, the fourth magnetic film 25 constituting the second pole portion 202 is laminated on one surface of the third magnetic film 24. Since the fourth magnetic film 25, which is separate from the third magnetic film 24, constituting the pole tip, is provided in this manner, the fourth magnetic film 25 can be employed as a yoke so that the magnetic flux required for write operations can be supplied from the fourth magnetic film 25 to the third magnetic film 24 constituting the pole tip. In other words, according to the present invention, a separate type thin film magnetic head in which a pole tip is provided separate from a yoke, can be provided.

In the embodiment, the first pole portion 201 includes a first magnetic film 21 and a second magnetic film 22 which lies adjacent to the gap film 23. The first magnetic film 21, on the other hand, is provided adjacent to the second magnetic film 22. By combining the structure for the first pole portion 201 and the structure of the second pole portion 202 described earlier, a structure achieved by providing the first magnetic film 21, the second magnetic film 22, the gap film 23, the third magnetic film 24 and the fourth magnetic film 25 adjacent to each other in this order, is obtained. By adopting this structure in which the second magnetic film 22 and the third magnetic film 24 are employed as pole tips, the head size, which determines the width of the data tracks, can be set very small, determined by the widths W11 and W21 of the second magnetic film 22 and the third magnetic film 24, so that the TPI capability is increased to achieve high density recording.

Yokes 211 and 251 constituted of the first magnetic film 21 and the fourth magnetic film 25 respectively are linked with each other at a rear linking portion 252 to complete a thin film magnetic circuit. A coil film 26 is provided winding around the linking portion 252 in a coil, and the coil film 26 is supported by an insulating film 27. The number of turns and the number of layers of the coil film 26 may be set freely. This structure ensures that the magnetic flux required for a write operation is supplied from the first magnetic film 21 and the fourth magnetic film 25 constituting the yokes 211 and 251 to the second magnetic film 22 and the third magnetic film 24 constituting the pole tips. In other words, a separate magnetic pole type magnetic head in which the pole portion and the yokes are separated is achieved.

Normally, the first magnetic film 21 to the fourth magnetic film 25 may be constituted of Permalloy. The gap film 23 may be constituted of a metal oxide such as $Al_2O_3$, $SiO_2$ or the like, or a nitride such as AlN, BN, SiN or the like. Alternatively, the gap film 23 may be constituted of a conductive nonmagnetic material such as Au, Cu or NiP.

The present invention is characterized in that the third magnetic film 24 has a width W20 at a position IP receding from its surface 240 facing opposite the medium by a receding quantity ΔL (see FIG. 4), which is larger than the width W21 at the surface 240 facing opposite the medium. This structure prevents magnetic saturation from occurring at the pole tip constituted of the third magnetic film 24 to eliminate the problems of degradation of the recording magnetic field pitch and the recording bleed occurring due to a leaked magnetic field.

Figure 4:
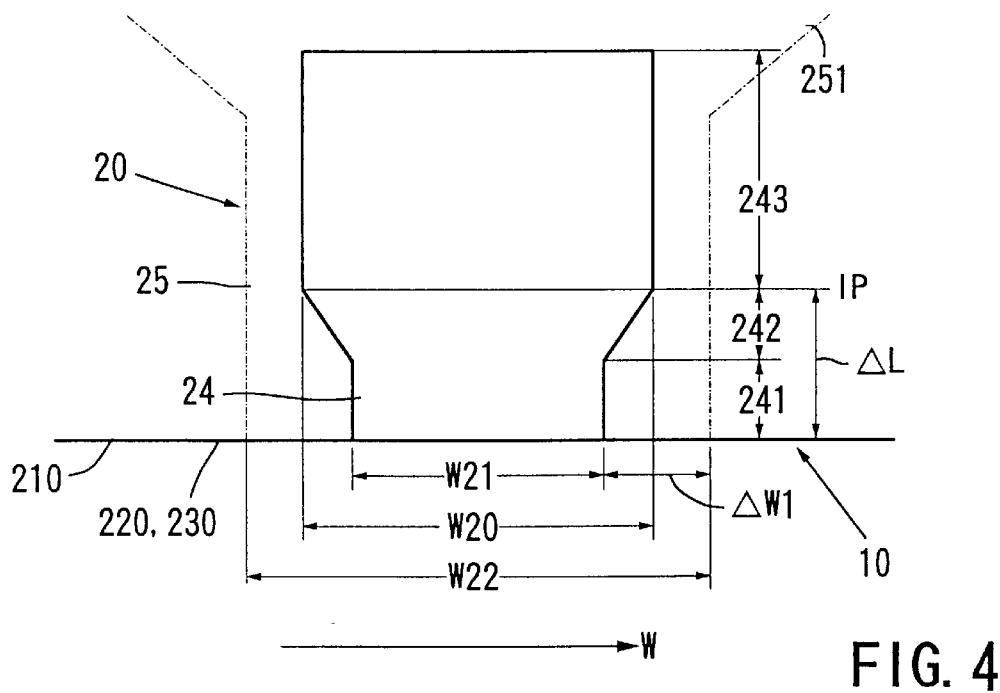
FIG. 4 is an enlarged plan view of the pole portion illustrated in FIGS. 2 and 3.

In FIG. 4, the third magnetic film 24 includes a first section 241, a second section 242 and a third section 243. The first section 241 represents an area which recedes rearward from the surface 240 facing opposite the medium while maintaining the width W21 at the surface 240 facing opposite the medium. Thus, the first section 241 constitutes a roughly rectangular area.

The second section 242 represents an area which is continuous with the rear of the first section 241 and expands from the width W21 at the surface 240 facing opposite the medium to achieve the width W20. Namely, the initial point of the second section 242 matches the end point of the first section 241, and the width of the second section 242 at its initial point is approximately equal to the width W21 of the first section 241.

The third section 243 represents an area which is continuous with the rear of the second section 242 and extends rearward while maintaining a width equal to or greater than the width W20 achieved by the second section 242. Consequently, the initial point of the third section 243 matches the end point of the second section 242, with the width at this point being W20. The receding quantity ΔL is constituted of the distance between the surface 240 of the third magnetic film 24 facing opposite the medium and the initial point IP of the third section 243.

It is desirable that the width ratio of the width W20 and the width W21 (W20/W21) satisfy $1.2 \leq (W20/W21) \leq 1.8$, since a high write magnetic field intensity can be achieved within this range. The write magnetic field intensity is greatly reduced outside the range.

In addition, the receding quantity ΔL representing the distance between the surface facing opposite the medium and the position IP at which the third magnetic film 24 is expanded to achieve the width W20 should be within the range of 0.2 to 0.8 μm to assure a sufficient write magnetic field intensity for magnetic recording. The write magnetic field intensity becomes rapidly reduced outside this range.

Figure 5:
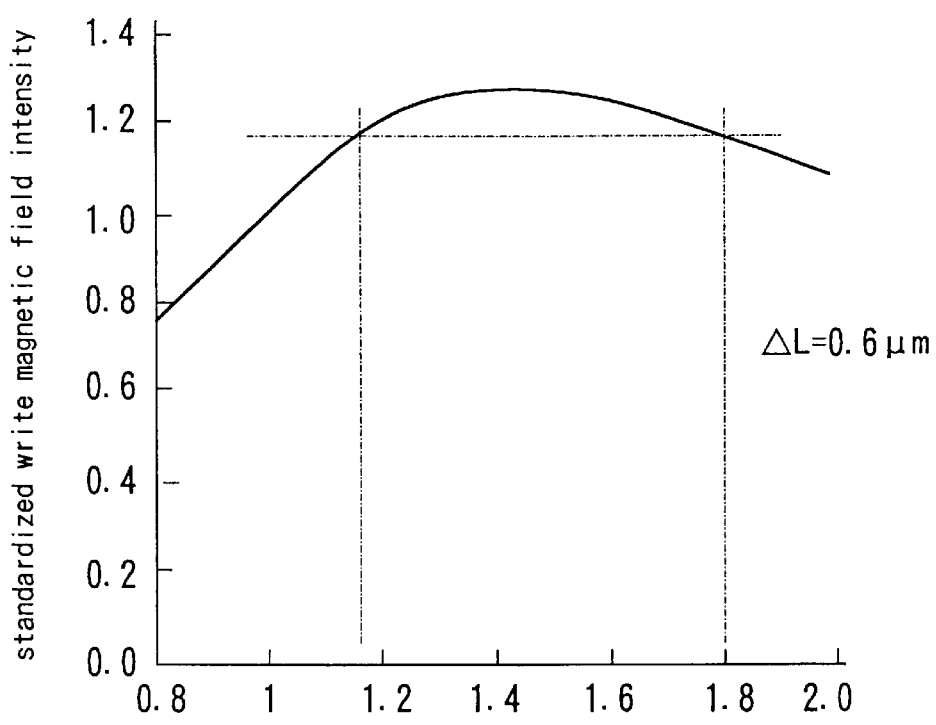
FIG. 5 presents data that illustrate the relationship between the width ratio (W20/W21) and the standardized write magnetic field intensity.

FIG. 5 presents data illustrating the relationship between the width ratio (W20/W21) and the standardized write magnetic field intensity. The data presented in FIG. 5 were obtained with the receding quantity ΔL set at 0.6 μm. The data in FIG. 5 indicate that write magnetic field intensity characteristics that achieve an upward arching curve are obtained within the range of $1.2 \leq (W20/W21) \leq 1.8$ to assure a high write magnetic field intensity. As the width ratio (W20/W21) becomes less than 1.2, the standardized magnetic field intensity becomes drastically reduced. As the width ratio (W20/W21) becomes larger than 1.8, the write magnetic field intensity becomes reduced remarkably, too. Although not shown, data indicating a similar tendency to that in FIG. 5 were obtained with the receding quantity ΔL set at 0.2 μm and 0.8 μm.

Figure 6:
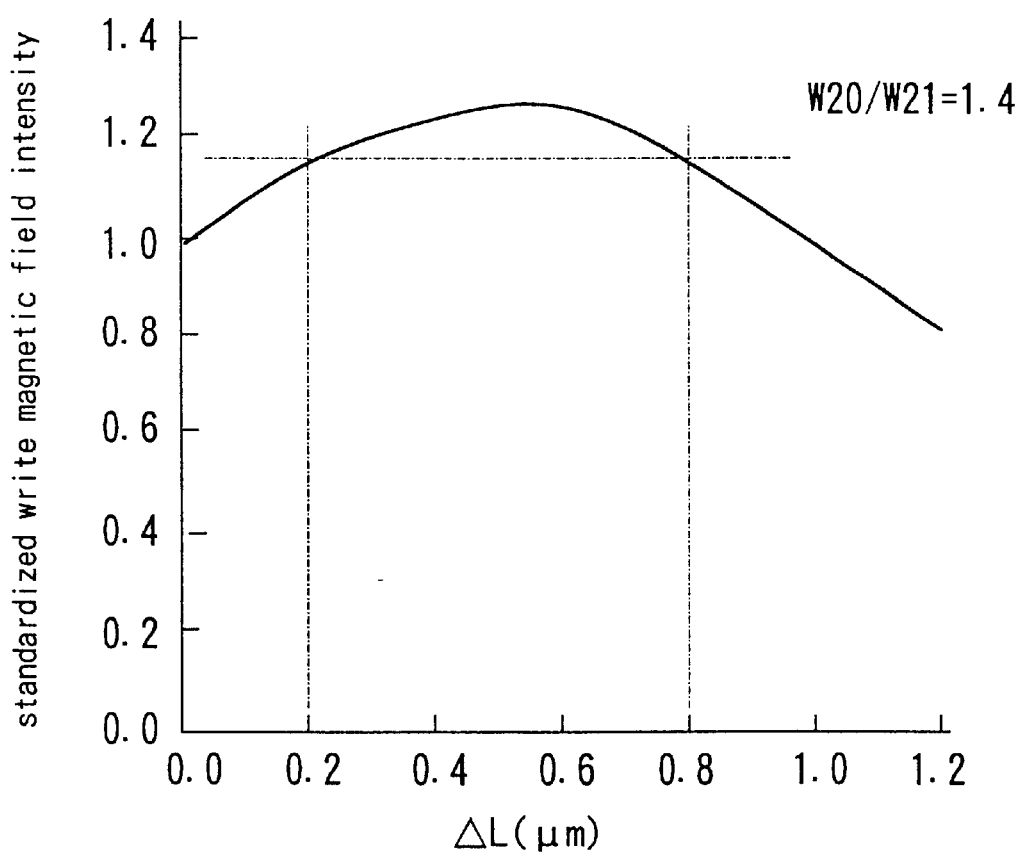
FIG. 6 presents data that illustrate the relationship between the quantity of recession ΔL and the standardized write magnetic field intensity.

FIG. 6 presents data illustrating the relationship between the receding quantity ΔL and the standardized write magnetic field intensity. The data presented in FIG. 6 were obtained by setting the width ratio (W20/W21) at 1.4. The data in FIG. 6 indicate that the write magnetic field intensity characteristics that achieve an upward arching curve are obtained within the range of $0.2 \leq \Delta L \leq 0.8$ to assure a high write magnetic field intensity. As the receding quantity ΔL becomes less than 0.2, the standardized magnetic field intensity becomes drastically reduced. As the receding quantity ΔL becomes larger than 0.8, the write magnetic field intensity becomes reduced remarkably, too. Although not shown, data indicating a similar tendency to that in FIG. 6 were obtained with the width ratio (W20/W21) set at 1.2 and 1.8.

In the embodiment, the width W22 of a surface 250 of the fourth magnetic film 25 facing opposite the medium is larger than the width W21 of the surface 240 of the third magnetic film 24 facing opposite the medium so that the fourth magnetic film 25 projects out toward the outside relative to the third magnetic film 24 at both sides in the widthwise direction. A width difference ΔW1=(W22−W21)/2 manifesting itself at both sides of the surfaces 240 and 250 facing opposite the medium due to the difference between the width W22 and the width W21 of the surface 240 of the third magnetic film 24 facing opposite the medium is equal to or less than 0.3 μm. In the range over which the width difference ΔW1 is equal to or less than 0.3 μm, the magnetic field leaking from the two ends of the fourth magnetic film 25 in its widthwise direction can be reduced to a small value equal to or less than 2.0 (kOe).

Figure 1:
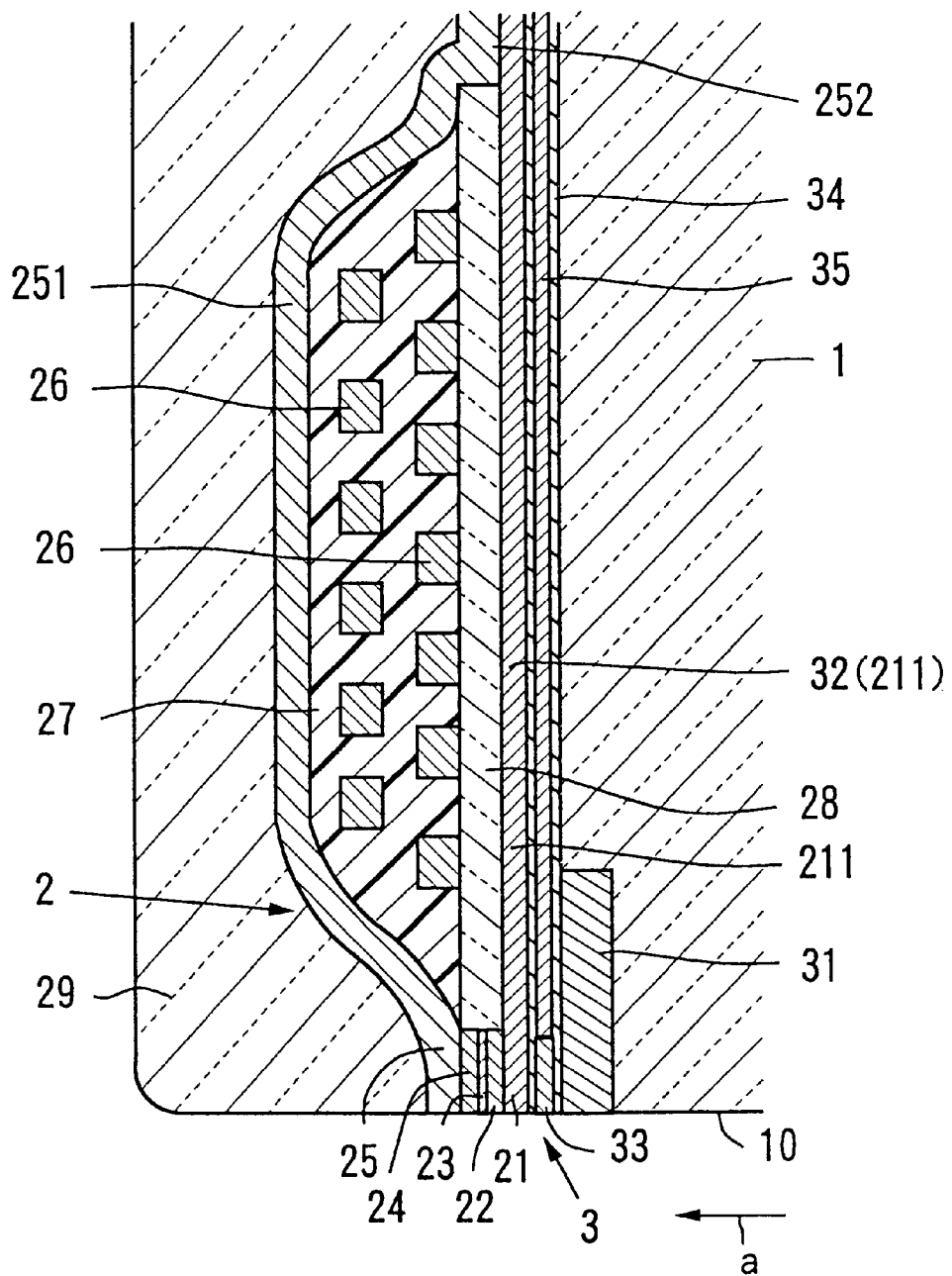
FIG. 1 is a sectional view of the thin film magnetic head according to the present invention.
Figure 2:
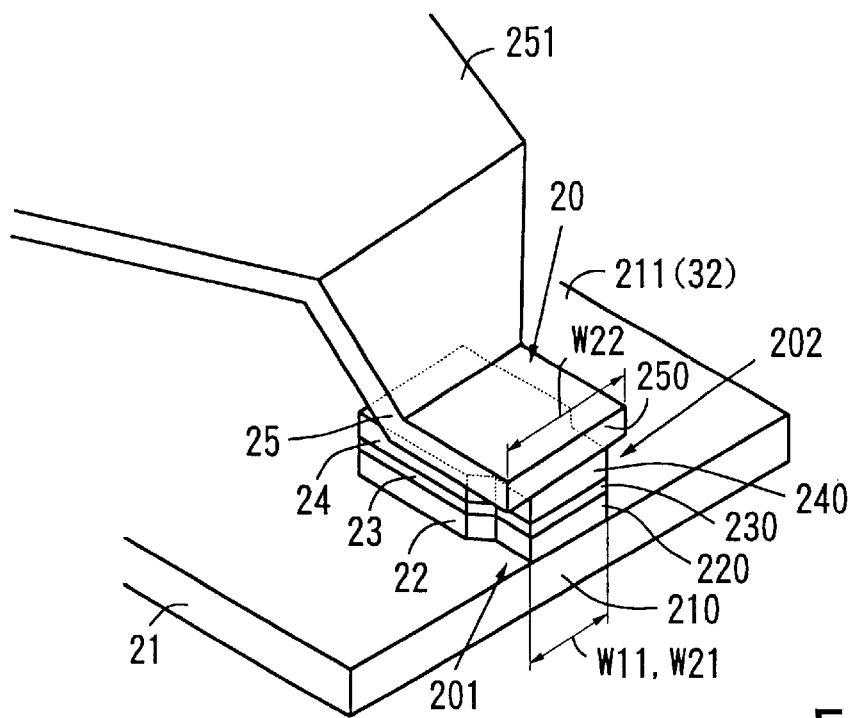
FIG. 2 is an enlarged perspective of the pole portion of the thin film magnetic head illustrated in FIG. 1.
Figure 7:
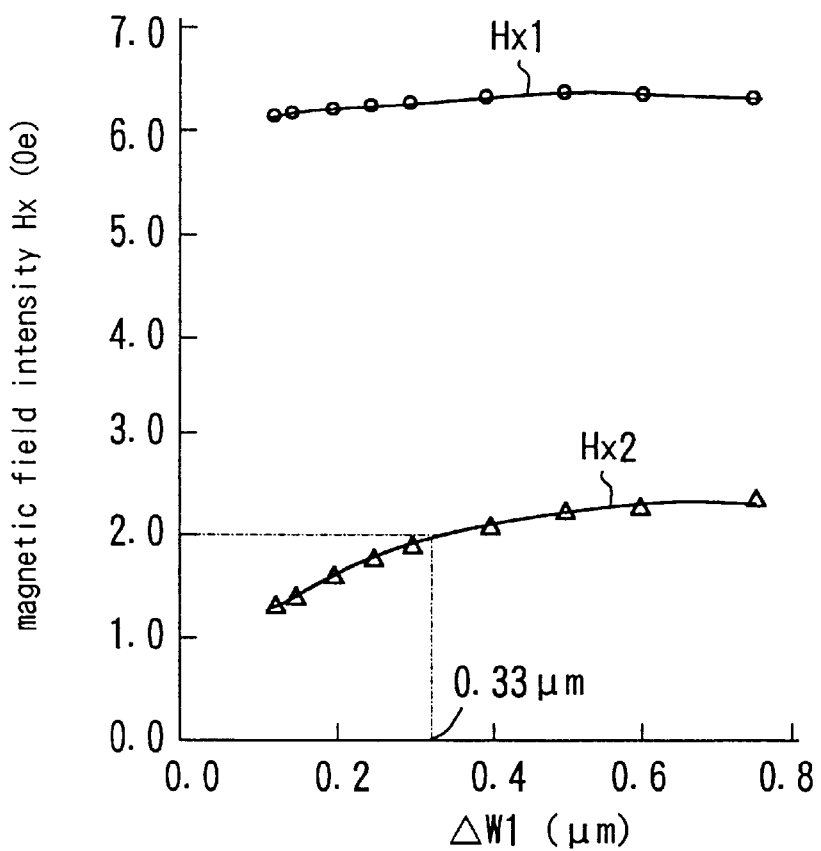
FIG. 7 presents data that illustrate the relationship between the width difference ΔW1 and the magnetic field intensity Hx.
Figure 8:
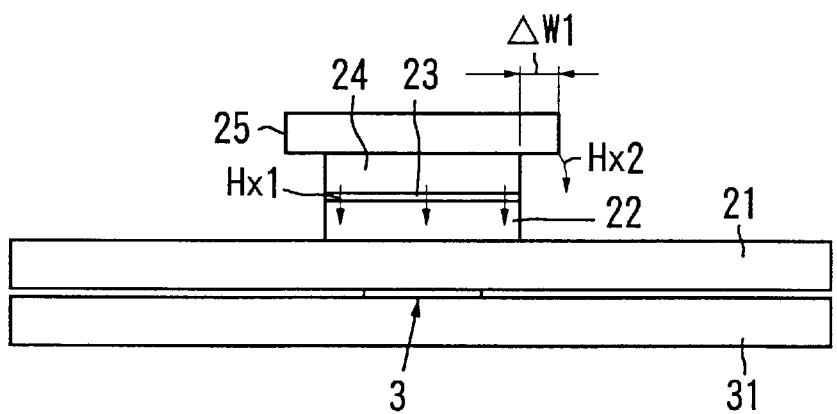
FIG. 8 illustrates the pole portion of the thin film magnetic head illustrated in FIGS. 1 to 3 viewed from the ABS and indicating the position at which the magnetic field intensities shown in FIG. 7 are measured.

FIG. 7 presents data illustrating the relationship between the width difference ΔW1 and the magnetic field intensity Hx, and FIG. 8 illustrates the pole portion of the thin film magnetic head illustrated in FIGS. 1 to 3, viewed from the ABS and indicating the positions at which the magnetic field intensity shown in FIG. 7 was measured. In FIG. 7, the curve Hx1 represents the write magnetic field intensity characteristics and the curve Hx2 represents the magnetic field intensity characteristics of the magnetic field leaking from the edges of the fourth magnetic film 25.

As indicated in FIG. 7, the leaked magnetic field Hx2 is equal to or less than 2.0 (kOe) in the range over which the width difference ΔW1 is approximately equal to or less than 0.3 μm. Furthermore, in the range over which the width difference ΔW1 is approximately equal to or less than 0.3 μm, a high write magnetic field intensity Hx1 equal to or larger than 6.0 (kOe) is achieved and, at the same time, no degradation in the write magnetic field intensity Hx1 is observed.

The width W21 of the surface 240 of the third magnetic film 24 facing opposite the medium should be set less than 0.2 μm to improve the track density. Such a small pole width can only be realized by constituting the thin film magnetic head according to the present invention as a separate magnetic pole type and is a great advantage of the separate magnetic pole type. It is difficult to achieve such a minute pole width in a thin film magnetic head in the prior art of a non-separate magnetic pole type.

The surfaces 210, 220, 230, 240 and 250 all facing opposite the medium, belonging to the first magnetic film 21, the second magnetic film 22, the gap film 23, the third magnetic film 24 and the fourth magnetic film 25 respectively, constitute a single flat surface. The flat surface constituted of the surfaces 210 to 250 facing opposite the medium constitutes a portion of the ABS 10. The second magnetic film 22, the gap film 23 and the third magnetic film 24 constitute a rear wall surface which is essentially a single flat surface on the side opposite from the surfaces 220 to 240 facing opposite the medium. This rear wall surface is essentially parallel to the ABS surface 10 constituted by the surfaces facing opposite the medium.

The area around the first magnetic film 21, the third magnetic film 24 and the gap film 23 is filled with a nonmagnetic insulating film 28 (see FIG. 1). The upper surface of the nonmagnetic insulating film 28 is flattened to form a flat surface that is essentially one and the same surface as the surface of the third magnetic film 24. The nonmagnetic insulating film 28 may be constituted of $Al_2O_3$, $SiO_2$ or the like. Reference number 29 indicates a protective film which covers the entire structure and is constituted of $Al_2O_3$, $SiO_2$ or the like.

The second magnetic film 22 and the third magnetic film 24 are normally constituted of Permalloy. In another mode, at least either the second magnetic film 22 or the third magnetic film 24 may be constituted of a material having higher saturation magnetic flux density compared to that of Permalloy. In this case, satisfactory recording performance is achieved even with a magnetic recording medium having a high coercivity. A high saturation magnetic flux density material having a higher saturation magnetic flux density compared to that of Permalloy should be selected for this purpose. For instance, at least one substance selected from Fe—Co, Fe—M and Fe—Co—M may be used. In this context, M represents at least one substance selected from N, C, B, Si, Al, Ti, Zr, Hf, Mo, Ta and Nb (all chemical symbols). The second magnetic film 22 and the third magnetic film 24 both may be constituted of the high saturation magnetic flux density material described above or only either one of them may be constituted of the high saturation magnetic flux density material.

In addition, at least either the first magnetic film 21 or the fourth magnetic film 25 may be constituted of a material having a higher resistivity compared to that of Permalloy. This structure will reduce the eddy current loss compared to a structure employing Permalloy, when the frequency is increased at the write circuit. Specific examples of the high resistivity material include at least one substance selected from Fe—Co amorphous, Fe—M—N, Fe—M—O, Fe—Co—M—N, Fe—Co—M—O and Fe—Co—N. In this context, M represents at least one substance selected from B, Si, Al, Ti, Zr, Hf, Mo, Ta and Nb (all chemical symbols). Both the first magnetic film 21 and the fourth magnetic film 25 may be constituted of the high resistivity material described above or only either one of them may be constituted of the high resistivity material.

In FIG. 1, the MR read element 3 includes a first shield film 31, a second shield film 32, an MR element 33 and a lead conductor film 35. The first shield film 31 and the second shield film 32 are provided over a distance from each other, with the MR element 33 provided between the first shield film 31 and the second shield film 32. The second shield film 32 constitutes the first magnetic film 21 of the write element 2. A nonmagnetic insulating film 34 is provided between the first shield film 31 and the second shield film 32, with the MR element 33 and the lead conductor film 35 provided inside the nonmagnetic insulating film 34.

The write element 2 is laminated onto the MR read element 3. In this structure, the second shield film 32 also functions as the first magnetic film 21 of the write element 2. Since the second magnetic film 22 projects out over the first magnetic film 21, the width W11 of the second magnetic film 22 can be reduced to a great degree while maintaining the width of the second shield film 32 to dimensions required to protect the MR read element 3.

According to the present invention, various types of inductive thin film magnetic transducers that have been proposed to date and that will be proposed in the future may be employed to constitute the write element 2. In addition, various types of read elements that have been proposed to date and that will be proposed in the future including those using a magnetic anisotropic magnetoresistive film such as a Permalloy film and those utilizing the giant magnetoresistance effect by employing a spin valve film, a tunnel junction effect film or the like, may be used to constitute the MR read element 3. The write element 2 and the MR read element 3 are mounted on a slider. The slider may be provided with one or more rails, or a slider without rails may be employed.

Figure 9:
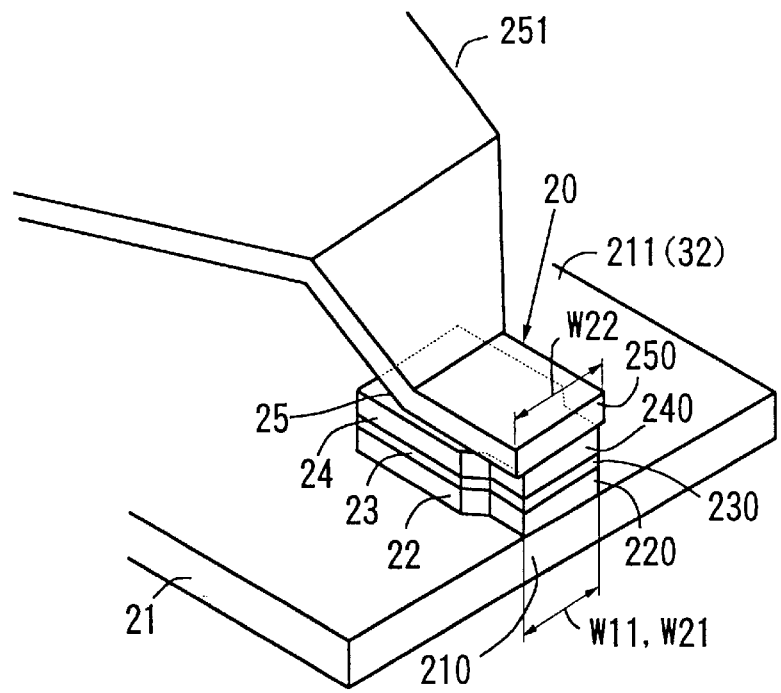
FIG. 9 is a perspective illustrating another embodiment of the pole portion.
Figure 10:
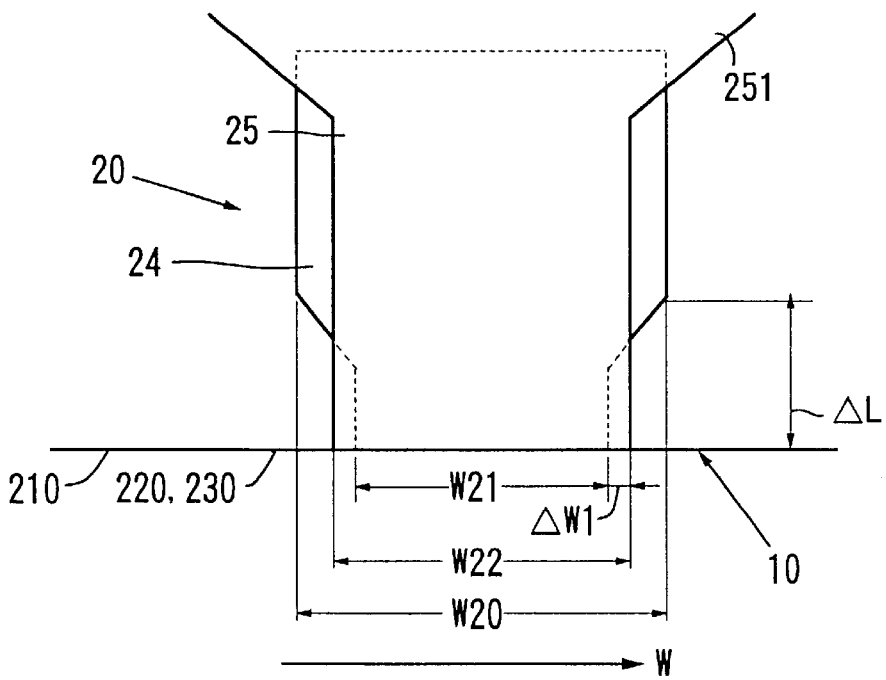
FIG. 10 is an enlarged plan view of the pole portion illustrated in FIG. 9.

FIG. 9 is a perspective illustrating another embodiment of the pole portion and FIG. 10 is an enlarged plan view of the pole portion illustrated in FIG. 9. In the figures, the same reference numbers are assigned to components identical to those in the FIGS. 2 to 4.

In this embodiment, too, the third magnetic film 24 adopts the structure described in reference to FIGS. 2 to 4. The width W22 of the surface 250 of the fourth magnetic film 25 facing opposite the medium is larger than the width W21 of the surface 240 of the third magnetic film 24 facing opposite the medium and, at the same time, is smaller than the width W20 achieved through the expansion. The width difference ΔW1=(W22−W21)/2 manifesting itself at both sides of the surfaces 240 and 250 facing opposite the medium in the widthwise direction due to the difference between the width W22 of the surface 250 facing opposite the medium and the width W21 of the surface 240 facing opposite the medium is equal to or less than 0.3 μm. Thus, advantages similar to those in the embodiment illustrated in FIGS. 2 to 4 are achieved.

Figure 11:
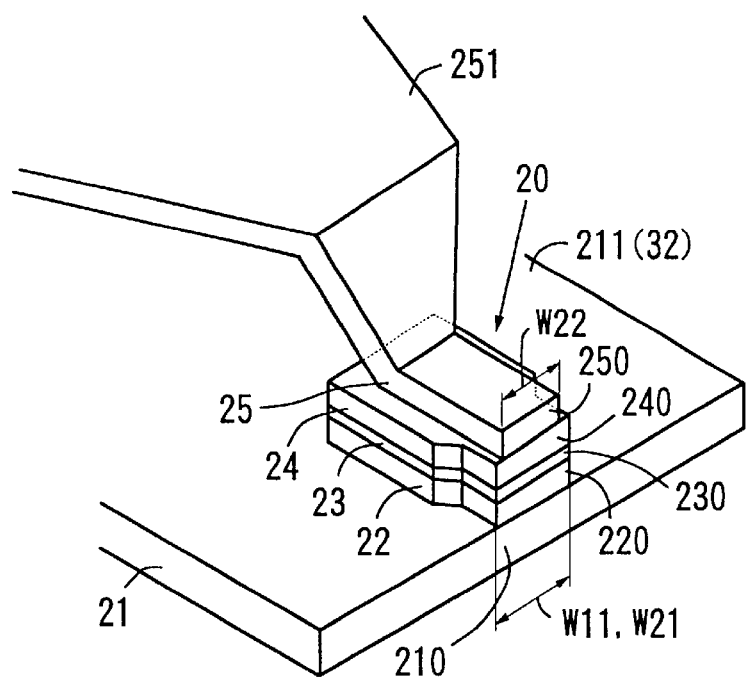
FIG. 11 is a perspective illustrating yet another embodiment of the pole portion.
Figure 12:
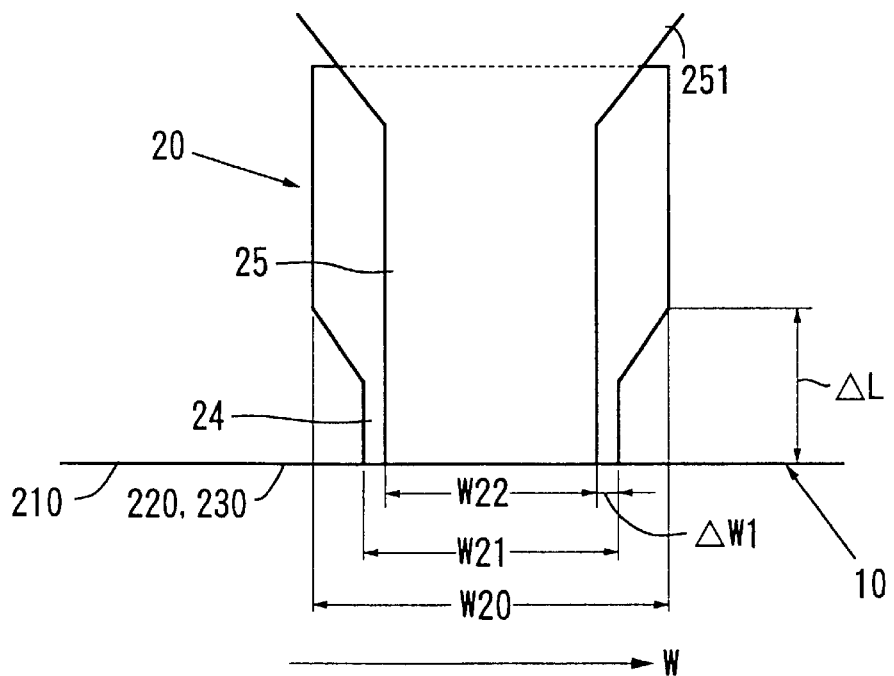
FIG. 12 is an enlarged plan view of the pole portion illustrated in FIG. 11.

FIG. 11 is a perspective illustrating yet another embodiment of the pole portion and FIG. 12 is an enlarged plan view of the pole portion illustrated in FIG. 11. In this embodiment, too, the third magnetic film 24 assumes the structure described in reference to FIGS. 2 to 4. Consequently, advantages similar to those in the embodiment illustrated in FIGS. 2 to 4 are achieved.

The third magnetic film 24 and the fourth magnetic film 25 achieve a correlation whereby the surface 250 of the fourth magnetic film 25 facing opposite the medium is set within the width W21 of the third magnetic film at its surface 240 facing opposite the medium. Thus, the width W21 at the surface 240 of the third magnetic film 24 facing opposite the medium and the width W22 at the surface 250 of the fourth magnetic film 25 facing opposite the medium achieves the relationship expressed as: W22≦W21. Through this structure, magnetic flux leaking through both sides of the surface 250 facing opposite the medium in the widthwise direction can be inhibited at the fourth magnetic film 25 that supplies magnetic flux to the third magnetic film 24, to prevent magnetic recording into the magnetic medium from occurring due to the leaked magnetic field. As a result, the track density is improved to achieve high density recording.

Furthermore, the width difference ΔW1=(W21−W22)/2 manifesting itself at both sides of the surfaces 240 and 250 facing opposite the medium in the widthwise direction due to the difference between the width W22 of the surface 250 facing opposite the medium and the width W21 of the surface 240 facing opposite the medium is equal to or less than 0.3 μm. This means that according to the present invention, the width difference ΔW1 is an absolute value representing the difference between the width W22 of the surface 250 facing opposite the medium and the width W21 of the surface 240 facing opposite the medium, which is equal to or less than 0.3 μm. Thus, advantages similar to those explained in reference to FIGS. 2 to 4 are achieved.

Figure 13:
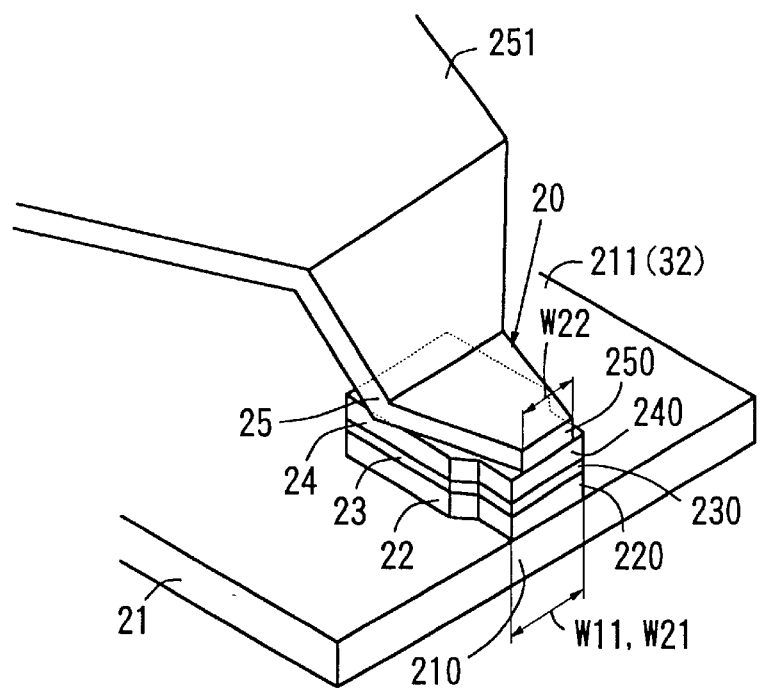
FIG. 13 is a perspective illustrating yet another embodiment of the pole portion.
Figure 14:
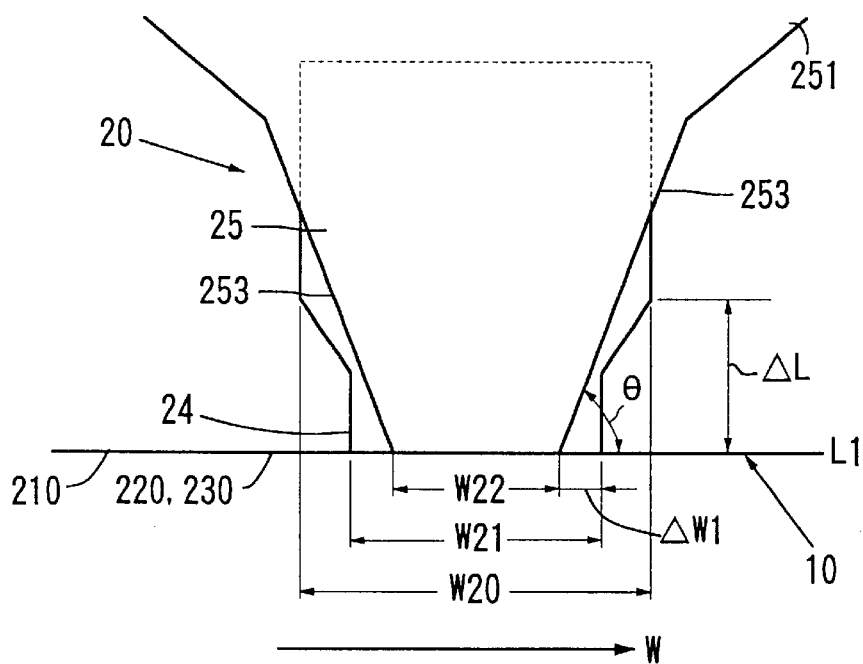
FIG. 14 is an enlarged plan view of the pole portion illustrated in FIG. 13.

FIG. 13 is a perspective illustrating yet another embodiment of the pole portion and FIG. 14 is an enlarged plan view of the pole portion illustrated in FIG. 13. In the figures, the same reference numbers are assigned to components identical to those in the FIGS. 2 to 4. In this embodiment, too, the third magnetic film 24 adopts the structure described in reference to FIGS. 2 to 4. Thus, advantages similar to those in the embodiment illustrated in FIGS. 2 to 4 are achieved.

The third magnetic film 24 and the fourth magnetic film 25 achieve a correlation whereby the surface 250 of the fourth magnetic film 25 facing opposite the medium is set within the width W21 at the surface 240 of the third magnetic film 24 facing opposite the medium. Thus, the width W21 at the surface 240 of the third magnetic film 24 facing opposite the medium and the width W22 at the surface 250 of the fourth magnetic film 25 facing opposite the medium satisfy a relationship expressed as W22≦W21. The advantages achieved through this structure have already been explained in reference to FIGS. 11 and 12.

In addition, in the embodiment illustrated in FIGS. 13 and 14, the width of the fourth magnetic film 25 gradually increases from its surface 250 facing opposite the medium toward the rear. This structure allows the write magnetic flux to concentrate from the fourth magnetic film 25 to the third magnetic film 24 to maintain the write capability without causing magnetic recording to occur due to the magnetic field leaking from the fourth magnetic film 25. In the structure, the fourth magnetic film 25 should expand as illustrated in FIG. 14 so that the angle θ formed by a line L1 parallel to the surface 250 facing opposite the medium and the two side surfaces 253 located in the direction of the width W satisfies 20°≦θ≦90°. It is even more desirable to set the range to 30°≦θ≦90°.

If the angle θ is smaller than 20°, magnetic saturation occurs at the third magnetic film 24 due to the magnetic flux concentrating from the fourth magnetic film 25 to the third magnetic film 24, which induces recording demagnetization. If the angle θ exceeds 90°, sufficient magnetic flux cannot be supplied from the fourth magnetic film 25 to the third magnetic film 24 and, as a result, the write capability is reduced. The two ends of the surface 250 of the fourth magnetic film 25 facing opposite the medium in the direction of the width W are restricted to be set at the positions at the two corners of the third magnetic film 24 even when the fourth magnetic film 25 expands to the maximum degree.

Figure 15:
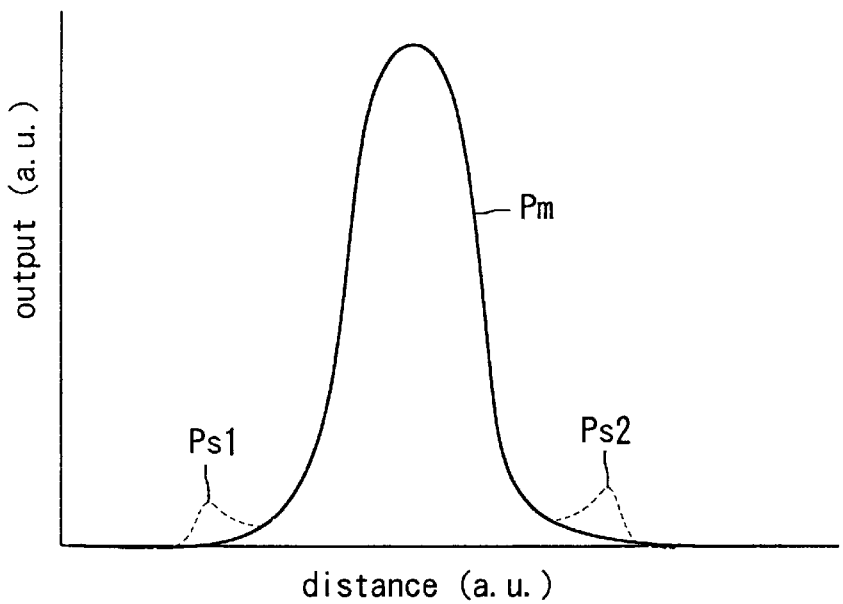
FIG. 15 presents the reproduction waveform data obtained by reading magnetic recording written using the thin film magnetic head.

Advantages achieved by the thin film magnetic head illustrated in FIGS. 11 to 14 are now explained in reference to specific test data. FIG. 15 presents reproduction waveform data obtained by reading out magnetic recording written by using the thin film magnetic head. The thin film magnetic head employed to obtain these data is structured as follows.

- width W11 and width W21: 1.3 μm;
- width W22: 1.1 μm;
- angle θ: 45°;
- width ratio (W20/W21): 1.4;
- ΔL: 0.6 μm;
- gap created by the gap film 23: 0.3 μm;
- first magnetic film 21: film thickness; 2.5 μm, NiFe plated film;
- second magnetic film 22: film thickness; 0.51 μm, NiFe plated film;
- third magnetic film 24: film thickness; 0.5 μm, NiFe plated film;
- fourth magnetic film 25: film thickness; 2.5 μm, NiFe plated film;
- coil film 26: 10 turns.

Using the thin film magnetic head structured as described above, a recording current of 40 mAop was supplied to the coil film 26 to perform magnetic recording to a magnetic recording medium with a coercivity Hc of 2300 (Oe) and residual magnetization t·Br of 80 Gμm. Then, reproduction was performed using a reproduction head having a magnetic anisotropic magnetoresistive element (AMR element) with a reproduction track width set at 1.0 μm.

For purposes of comparison, magnetic recording was performed using a thin film magnetic head in the prior art and reproduction was performed using the reproduction head described above provided with an AMR element. The thin film magnetic head in the prior art employed in the test was structured identically to the thin film magnetic head according to the present invention except that the width ratio (W20/W21) was 1, the width W22 was set at 2.0 μm and the angle θ was set at 90°.

In FIG. 15, the characteristics Pm (main pulse) indicated by the solid line represent the reproduction waveform achieved by performing recording with the thin film magnetic head according to the present invention, whereas the characteristics that include the characteristics Pm indicated by the solid line and Ps1 an Ps2 (side pulses) indicated by the dotted lines represent the reproduction waveform achieved by the thin film magnetic head in the prior art. In reference to FIG. 15, when performing recording with the thin film magnetic head in the prior art, the side pulses Ps1 and Ps2 appear in the reproduction waveform in addition to the main pulse Pm. In contrast, only the main pulse Pm manifests itself in the recording performed with the thin film magnetic head according to the present invention, and the side pulses Ps1 and Ps2 caused by magnetic recording occurring due to the leaked magnetic field are not read.

Figure 16:
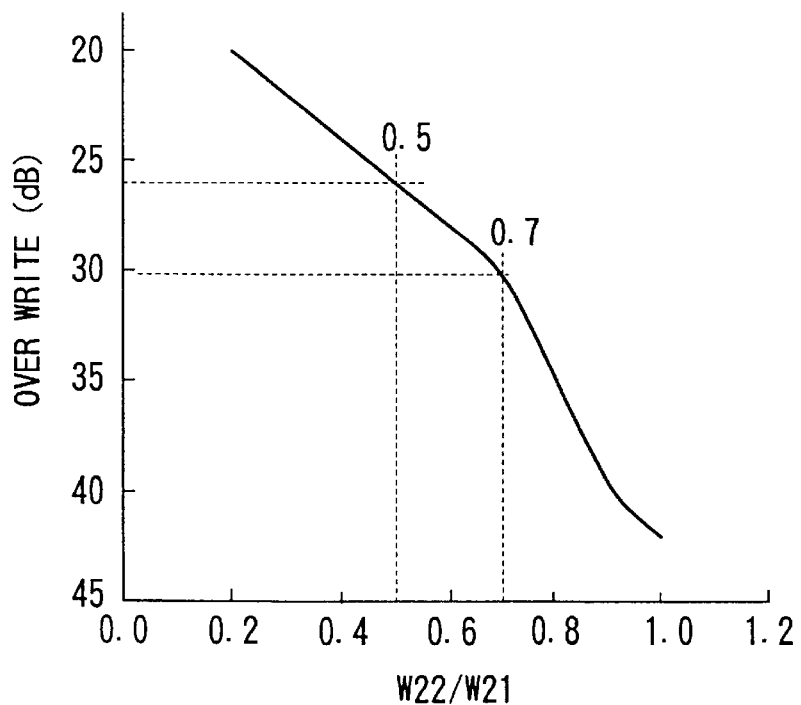
FIG. 16 illustrates the relationship between the width ratio (W22/W21) and the overwrite characteristics.

FIG. 16 presents data that illustrate the relationship between the width ratio (W22/W21) and the overwrite characteristics. The thin film magnetic head used in the test is the thin film magnetic head according to the present invention 6 which was employed to obtain the data presented in FIG. 15. However, the width ratio (W22/W21) was varied by changing the width W22 while setting the width W11 and the width W21 at a fixed value of 1.3 μm.

In reference to FIG. 16, overwrite characteristics equal to or exceeding 26 (dB) were achieved within the range of $0.5 \leq W22/W21 \leq 1.0$. In particular, overwrite characteristics equal to or exceeding 30 (dB) were achieved in the range of $0.7 \leq W22/W21 \leq 1.0$, and furthermore, in this range, a marked rate of increase in the overwrite characteristics relative to the change in (W22/W21) is observed.

Under normal circumstances, in the field of magnetic recording, overwrite characteristics of at least 26 (dB) and preferably overwrite characteristics equal to or exceeding 30 (dB) are required. In reference to FIG. 16, it is obvious that this requirement can be satisfied by setting the width ratio within the range of $0.5 \leq W22/W21 \leq 1.0$ and more preferably, within the range of $0.7 \leq W22/W21 \leq 1.0$. Particularly within the range of $0.7 \leq W22/W21 < 1.0$, since a significant increase in the overwrite characteristics relative to the change in (W22/W21) is achieved, a remarkable improvement in the overwrite characteristics is realized.

Figure 17:
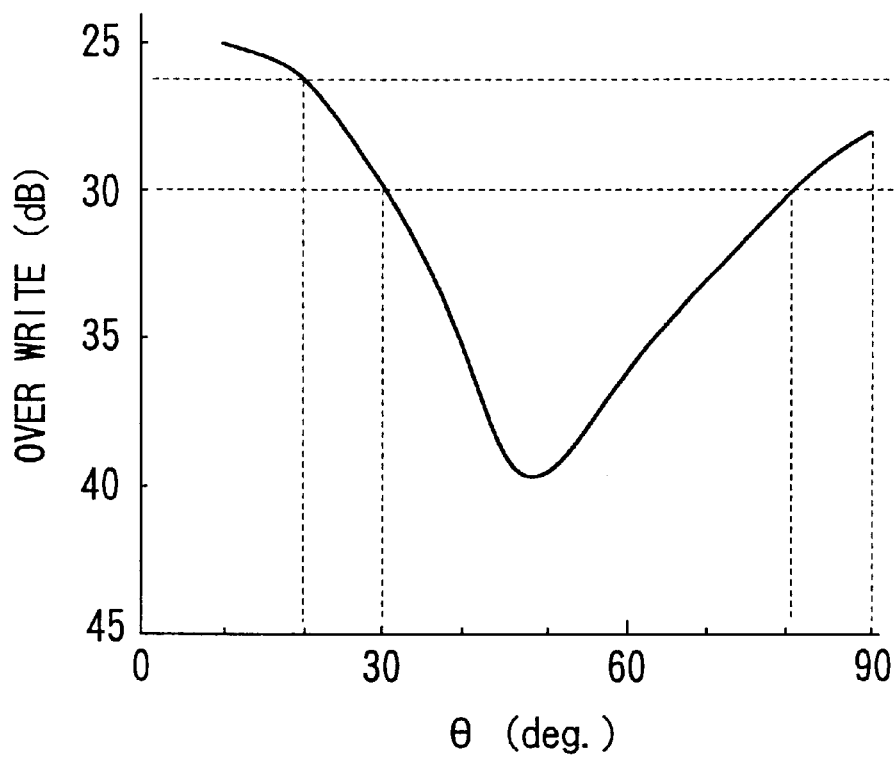
FIG. 17 presents data illustrating the relationship between the angle θ and the overwrite characteristics.

FIG. 17 presents data that illustrate the relationship between the angle θ and the overwrite characteristics. The thin film magnetic head employed in the test is the thin film magnetic head according to the present invention that was employed to obtain the data presented in FIG. 15. However, the width W11 and the width W21 were set at 1.3 μm and the width W22 was set at 1.1 μm to measure the overwrite characteristics while varying the angle θ.

As already mentioned, it is required in the area of magnetic recording that overwrite characteristics of at least 26 (dB), and even more preferably overwrite characteristics of at least 30 (dB), be achieved. In reference to FIG. 17, it is obvious that this requirement is satisfied by setting the angle θ within the range of $20° \leq \theta \leq 90°$, and more preferably within the range of $30° \leq \theta \leq 90°$.

While the invention has been particularly shown and described with respect to preferred embodiments thereof by referring to the attached drawings, the present invention is not limited to the example and it will be understood by those skilled in the art that various changes in form and detail may be made therein without departing from the spirit, scope and teaching of the invention.

What is claimed is:

1. A thin film magnetic head comprising:
   at least one write element, said write element comprising a first pole portion, a second pole portion and a gap film provided between said first pole portion and said second pole portion, said second pole portion having a third magnetic film provided adjacent to said gap film and a fourth magnetic film provided adjacent to said third magnetic film, wherein
   said third magnetic film and said fourth magnetic film each have a surface facing opposite a medium at an air bearing surface of the thin film magnetic head;
   said third magnetic film has a width (W20) at a position receding from the surface thereof facing opposite said medium which is larger than a width (W21) at said surface facing opposite said medium, said fourth magnetic film is formed separate from said third magnetic film and has a width (W22) at said surface facing opposite said medium which is larger than said width (W21) of said third magnetic film at said surface facing opposite said medium, and the width (W22) of said fourth magnetic film differs from the width (W20) of said third magnetic film at the receding position.

2. The thin film magnetic head of claim 1 wherein said first pole portion includes a first magnetic film and a second magnetic film with said second magnetic film provided adjacent to said gap film and said first magnetic film provided adjacent to said second magnetic film.

3. The thin film magnetic head of claim 1, wherein said third magnetic film includes:
   a first section representing an area receding rearward from said surface facing opposite said medium while maintaining said width (W21) of said surface facing opposite said medium;
   a second section representing an area continuous to the rear of said first section which expands from said width (W21) at said surface facing opposite said medium to achieve said width (W20); and
   a third section representing an area continuous to the rear of said second section, which extends rearward while maintaining a width equal to or larger than said width (W20) achieved through expansion of said second section.

4. The thin film magnetic head of claim 1, wherein a receding quantity representing a distance from said surface facing opposite said medium to a position where said width (W20) is achieved through expansion is withing the range of 0.2 to 0.8 μm.

5. The thin film magnetic head of any of claims 1 through 4 wherein the ratio (W20/W21) of said width (W20) and said width (W21) satisfies $1.2 \leq (W20/W21) \leq 1.8$.

6. The thin film magnetic head of claim 1 wherein a width difference (ΔW1) between said width (W22) and said width (W21) is equal to or less than 0.3 μm.

7. The thin film magnetic head of claim 1 wherein said width (W21) and said width (W22) satisfy a relationship expressed as $0.5 \leq (W22/W21) < 1.0$.

8. The thin film magnetic head of claim 7 wherein said width (W21) and said width (W22) satisfy a relationship expressed as $0.7 \leq (W22/W21)$.

9. The thin film magnetic head of claim 1 wherein said width (W21) is less than 2.0 μm.

10. The thin film magnetic head of claim 2, wherein said first magnetic film includes a first film portion extending rearward from said first pole portion with said first film portion constituting a first yoke;

wherein said second magnetic film and said third magnetic film constitute pole tips; and wherein said fourth magnetic film includes a fourth film portion extending rearward from said second pole portion, with said fourth film portion constituting a second yoke, and the rear of said second yoke linked to said first yoke of said first magnetic film.

11. The thin film magnetic head of claim 2 wherein surfaces of said first magnetic film, said second magnetic film, said gap film, said third magnetic film and said fourth magnetic film all facing opposite said medium essentially constitute a single flat surface.

12. The thin film magnetic head of claim 11 wherein said second magnetic film, said gap film and said third magnetic film constitute a rear wall surface which is essentially a single flat surface on a side opposite from said surfaces facing opposite said medium; and said rear wall surface is essentially parallel to said flat surface constituted of said surfaces facing opposite said medium.

13. The thin film magnetic head of claim 1 further provided with an MR read element.

14. The thin film magnetic head of claim 13 wherein said MR read element includes a first shield film, a second shield film and an MR material, said MR material provided between said first shield film and said second shield film, and said second shield film constituting said first magnetic film of said write element.

* * * * *